(12) United States Patent
Weis et al.

(10) Patent No.: US 10,682,883 B2
(45) Date of Patent: Jun. 16, 2020

(54) CONNECTION JOINT WITH BROACH-FORMED INTEGRAL CHIP RETAINER

(71) Applicant: McGard LLC, Orchard Park, NY (US)

(72) Inventors: Kyle M. Weis, Tonawanda, NY (US); Andrew D. Trank, Orchard Park, NY (US)

(73) Assignee: McGard LLC, Orchard Park, NY (US)

( * ) Notice: Subject to any disclaimer, the term of this patent is extended or adjusted under 35 U.S.C. 154(b) by 580 days.

(21) Appl. No.: 14/679,150

(22) Filed: Apr. 6, 2015

(65) Prior Publication Data

US 2015/0285292 A1  Oct. 8, 2015

Related U.S. Application Data

(60) Provisional application No. 61/975,951, filed on Apr. 7, 2014.

(51) Int. Cl.
| | | |
|---|---|---|
| *G05G 1/12* | (2006.01) | |
| *B60B 27/00* | (2006.01) | |
| *B60B 3/16* | (2006.01) | |

(52) U.S. Cl.
CPC .............. *B60B 27/00* (2013.01); *B60B 3/16* (2013.01); *F16B 2200/10* (2018.08); *Y10T 29/49826* (2015.01)

(58) Field of Classification Search
CPC ......... Y10T 403/7039; Y10T 29/49826; B60B 3/16; B60B 27/00; F16B 37/068

(Continued)

(56) References Cited

U.S. PATENT DOCUMENTS 1,794,849 A * 3/1931 Hagstedt .................. H02G 3/06
                                                    285/149.1
2,025,223 A * 12/1935 Watson .................... F16N 21/02
                                                    285/189

(Continued)

FOREIGN PATENT DOCUMENTS

| DE | 102007005667 A1 | 1/2001 |
| DE | 102008030048 A1 | 12/2009 |

(Continued)

OTHER PUBLICATIONS

The International Search Report (ISR) for International (PCT) Application No. PCT/US2015/024427; Publication No. WO 2015/157139; dated Jul. 16, 2015.

(Continued)

*Primary Examiner* — Joshua T Kennedy
(74) *Attorney, Agent, or Firm* — Harter Secrest & Emery LLP (57) ABSTRACT

A method for forming a permanent connection joint to interconnect structures. The method may include inserting a post on a first structure into a socket on a second structure, with one of the post or the socket being configured to form an integral chip retainer on the other of the post or the socket during the inserting that permanently locks the post in the socket. In another aspect, a permanent connection joint is provided. The connection joint may include a post disposed in a socket, a chip retainer integrally formed on one of the post or the socket, and a recess formed on the other of the post or the socket, the chip retainer being lockingly engaged in the recess. In example embodiments, the integral chip retainer is formed by broaching as the post is installed in the socket during connection formation.

15 Claims, 12 Drawing Sheets

(58) Field of Classification Search
USPC .............. 403/359.3, 361; 411/180, 396, 172
See application file for complete search history.

(56) References Cited

U.S. PATENT DOCUMENTS

| | | | |
|---|---|---|---|
| 2,358,728 A | 9/1944 | Miller | |
| 2,530,066 A * | 11/1950 | Laase | B23D 37/16 409/260 |
| 2,972,274 A | 2/1961 | La Bombard et al. | |
| 3,068,508 A | 12/1962 | Heyer | |
| 3,081,137 A * | 3/1963 | Kolokythas | B65D 51/30 220/522 |
| 3,093,887 A * | 6/1963 | Prestige | B21D 39/03 174/153 R |
| 3,125,146 A * | 3/1964 | Rosan | F16B 37/068 411/180 |
| 3,130,503 A * | 4/1964 | Rosan | A43B 21/42 36/34 R |
| 3,178,835 A * | 4/1965 | Burke | A43B 21/24 36/34 A |
| 3,461,936 A * | 8/1969 | Rosan, Sr. | F16B 37/068 29/432 |
| 3,511,322 A * | 5/1970 | Bixby et al. | B23Q 11/0046 126/25 A |
| 3,915,052 A * | 10/1975 | Ruhl | F16B 19/05 411/361 |
| 3,951,561 A | 4/1976 | Speakman | |
| 4,975,007 A * | 12/1990 | Molina | B25B 27/0007 411/107 |
| 5,017,068 A | 5/1991 | Cooksey | |
| 5,122,059 A * | 6/1992 | Durr | A61C 8/005 433/173 |
| 5,324,148 A * | 6/1994 | Notaro | F16B 35/00 411/373 |
| 5,984,680 A * | 11/1999 | Rogers | A61C 8/005 433/172 |
| 6,174,117 B1 * | 1/2001 | Kawatani | B23P 11/00 411/107 |
| 6,527,489 B2 * | 3/2003 | Kando | B21J 15/02 29/511 |
| 6,802,656 B2 * | 10/2004 | Arbuckle | F16M 11/06 348/143 |
| 6,877,497 B2 * | 4/2005 | Skinner | F02P 3/02 123/634 |
| 7,374,381 B2 * | 5/2008 | Maloney | B23P 19/062 403/408.1 |
| 7,594,788 B2 * | 9/2009 | Maloney | F16B 5/04 411/180 |
| 7,607,877 B1 * | 10/2009 | Lam | H05K 7/1407 411/180 |
| 8,414,238 B2 * | 4/2013 | Inagaki | B60T 13/567 411/107 |
| 8,469,459 B2 * | 6/2013 | Lauffer | B60B 7/0013 301/37.102 |
| 9,206,833 B2 * | 12/2015 | Hunter | F16B 37/14 |
| 2002/0054806 A1 * | 5/2002 | Sakamura | B21J 15/12 411/180 |
| 2004/0110569 A1 | 6/2004 | Weedon | |
| 2005/0060870 A1 * | 3/2005 | Exposito | B23P 11/00 29/592 |
| 2009/0324360 A1 | 12/2009 | Schuech et al. | |
| 2010/0003075 A1 | 1/2010 | Lang et al. | |
| 2010/0140920 A1 | 6/2010 | Kloss et al. | |
| 2011/0068247 A1 * | 3/2011 | Summers | F16L 3/123 248/505 |
| 2012/0255158 A1 | 10/2012 | Kawasaki | |
| 2014/0361606 A1 | 12/2014 | Mochinaga | |

FOREIGN PATENT DOCUMENTS

| | | |
|---|---|---|
| DE | 102009043269 A1 | 3/2011 |
| EP | 2184525 B1 | 10/2011 |
| WO | 2013042595 A1 | 3/2013 |

OTHER PUBLICATIONS

The Written Opinion of the International Search Authority for International (PCT) Application No. PCT/US2015/024427; Publication No. WO 2015/157139; dated Jul. 16, 2015.

* cited by examiner

CONNECTION JOINT WITH BROACH-FORMED INTEGRAL CHIP RETAINER

TECHNICAL FIELD

The present disclosure relates to connection joints for interconnecting structures. More particularly, the disclosure is directed to permanent joints that are not intended to be disconnected following joint formation.

BACKGROUND

By way of background, various type of permanent connection joints for interconnecting structures have been proposed. In bore and shaft connections, it is common to use retainer rings that seat in opposing grooves on the bore and shaft. The retainer rings are deformable to allow for installation. For example, when a shaft is installed in a bore, a retainer ring may be compressed in a groove on the shaft before it is inserted. As the shaft is advanced in the bore, it will reach a point where the shaft groove containing the compressed retainer ring becomes aligned with a matching groove in the bore. The compressed retainer ring, now being unconstrained by the sidewall of the bore, will uncompress. The outer diameter of the retainer ring will snap into engagement with the bore's retaining groove while its inner diameter will remain in engagement with the shaft's retaining groove. The shaft will thereby be permanently retained in the bore.

It is to improvements in permanent connection joints that the present disclosure is directed. In particular, a permanent connection joint that does not require a separate retainer ring is proposed. The disclosed technique is applicable to bore and shaft connections, but also has broader application to virtually any type of structural connection.

BRIEF SUMMARY OF THE INVENTION

A method is provided for forming a permanent connection joint to interconnect structures. In a broad aspect, the method includes inserting a post on a first structure into a socket on a second structure, with one of the post or the socket being configured to broach-form an integral chip retainer on the opposing post or socket that permanently locks the post in the socket.

In a more detailed aspect, a method for forming a permanent connection joint to interconnect structures includes selecting a first structure having a post and a second structure having a socket. The post and the socket are adapted to be joined together in opposing relationship, with the post disposed in the socket. One of the post or the socket has a knurl with one or more projections that each act as a broaching implement. The post or socket having the knurl also has a recess disposed adjacent to the knurl. When the post is introduced into the socket and advanced therein, the one or more knurl projections act as broaching implements that broach the surface of the opposing post or socket and form one or more broach chips on the surface that are captured in the recess. The one or more broach chips provide a self-formed integral chip retainer that permanently locks the post in the socket by virtue of the broach chip(s) being captured in the recess.

In another broad aspect, a permanent connection joint is provided. The connection joint may include a post disposed in a socket. An integral chip retainer is formed on one of the post or the socket, a recess is formed on the opposing post or socket, and the chip retainer is lockingly engaged in the recess.

In a more detailed aspect, a permanent connection joint includes a post and a socket. The post and the socket are adapted to be joined together in opposing relationship, with the post disposed in the socket. One of the post or the socket has a knurl with one or more projections that each comprise a broaching implement. The post or socket having the knurl also has a recess disposed adjacent to the knurl. The post is disposed in the socket with the one or more knurl projections having formed broach chips on the surface of the opposing post or socket that are captured in the recess. The one or more broach chips provide a self-formed integral chip retainer that permanently locks the post in the socket by virtue of the broach chip(s) being captured in the recess.

In an embodiment of the connection joint or the connection joint method, the knurl and the recess may be part of the post, and the chip retainer may be part of the socket.

In another embodiment of the connection joint or the connection joint method, the knurl and the recess may be part of the socket, and the chip retainer may be part of the post.

In another embodiment of the connection joint or the connection joint method, the knurl may comprise plural projections.

In another embodiment of the connection joint or the connection joint method, the knurl may comprise a cylindrical structure with plural radially extending teeth projections.

In another embodiment of the connection joint or the connection joint method, the knurl may comprise a single annular projection.

In another embodiment of the connection joint or the connection joint method, the knurl may comprise an n-sided polygon structure whose corners provide n projections.

In another embodiment of the connection joint or the connection joint method, the knurl may comprise a square structure whose corners provide four projections.

In another embodiment of the connection joint or the connection joint method, the knurl may comprise a triangular structure whose corners provide three projections.

In another embodiment of the connection joint or the connection joint method, the recess may comprise an annular groove.

DETAILED DESCRIPTION OF EXAMPLE EMBODIMENTS

Figure 1:
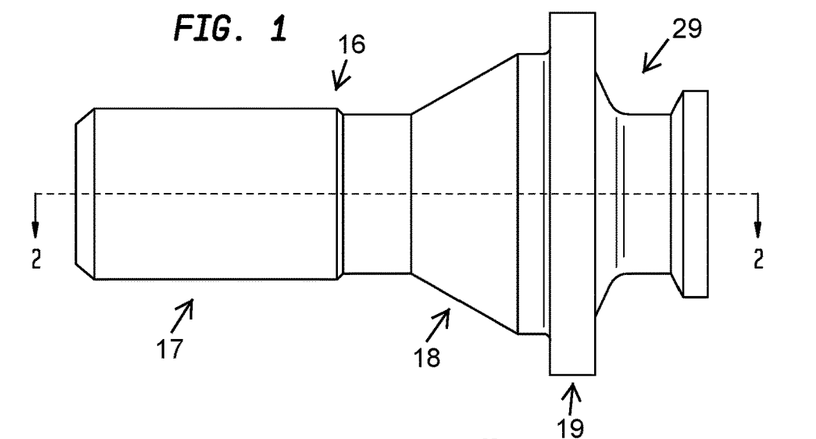
FIG. 1 is a side elevation showing two example structures interconnected by a first connection joint embodiment that may be formed in accordance with the present disclosure.

Turning now to the drawing figures, FIG. 1 illustrates two example structures interconnected by a first connection joint embodiment that may be formed in accordance with the present disclosure. The illustrated connection joint may be used to interconnect structures of virtually any type. By way of example only, FIG. 1 shows an embodiment wherein the structures are components of a bolt-type vehicle wheel lock fastener. The left-hand structure comprises a fastener body having threads 17, a tapered seat 18, and an annular flange 19 that may be formed with an external key pattern (not shown). The right-hand structure 29 comprises a guide that mounts on the fastener body for supporting a key tool (not shown) as it engages the key pattern and torques the fastener. Again, the illustrated structures represent merely one possible example of the myriad applications for which the connection joint technology disclosed herein may be used. As such, the selection of a fastener application to depict example embodiments should in no way be considered limiting as to the scope and breadth of the subject matter disclosed and claimed herein.

Figure 2:
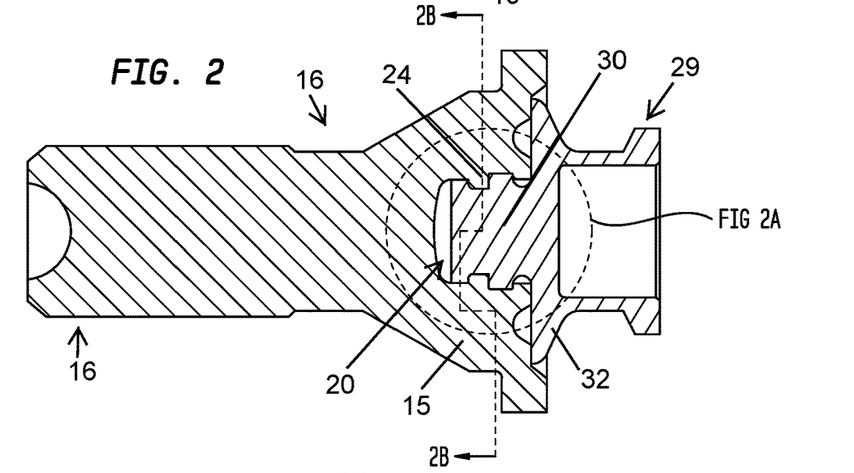
FIG. 2 is a cross-sectional view taken along line 2-2 in FIG. 1 showing post and socket components that may be used in the first connection joint embodiment.
Figure 2A:
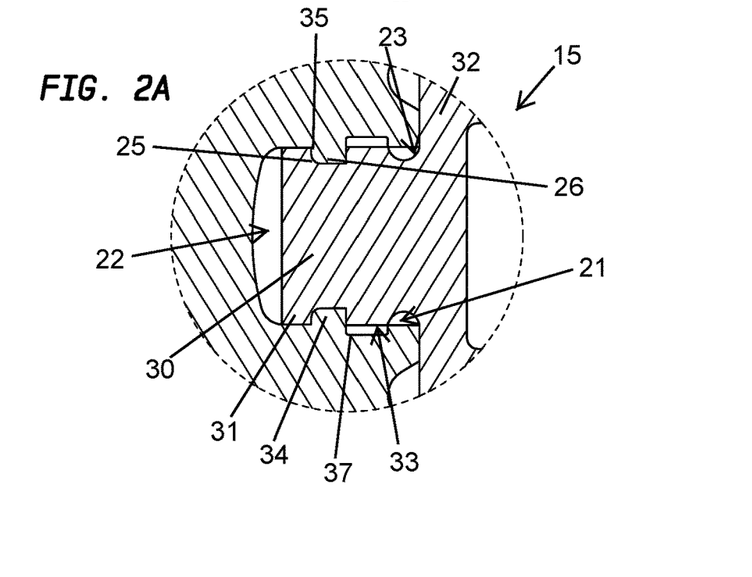
FIG. 2A is an enlarged fragmentary view showing a portion of the cross-sectional view of FIG. 2 to better depict the illustrated post and socket connection components.
Figure 3:
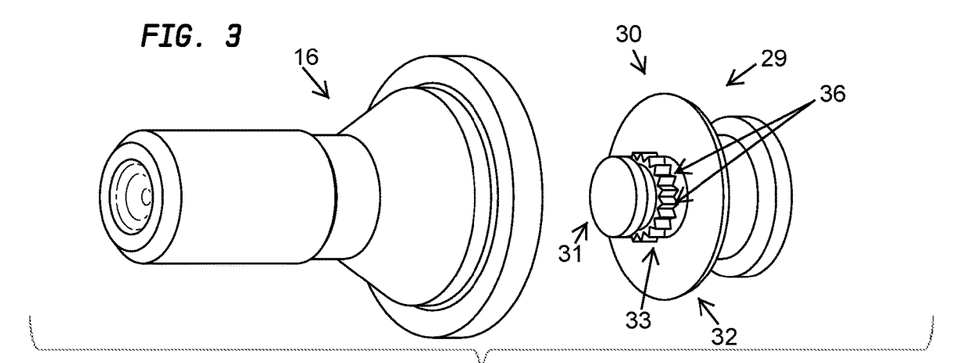
FIG. 3 is perspective view showing the example structures of FIG. 1 prior to interconnection, with the post aligned for insertion in the socket.
Figure 4:
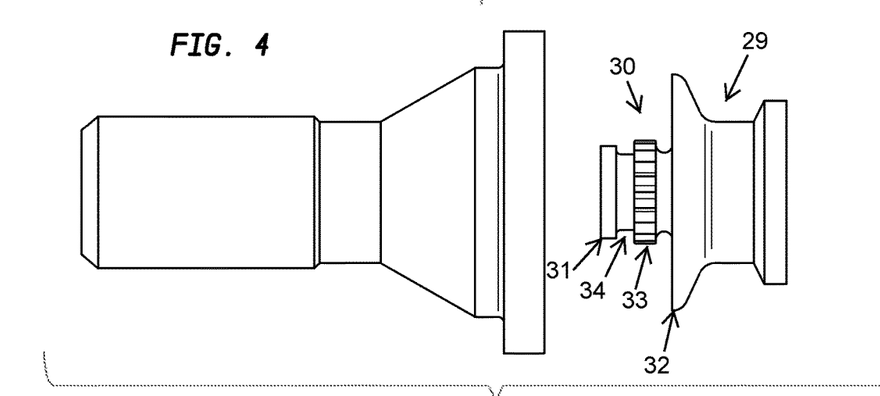
FIG. 4 is a side elevation view showing the example structures of FIG. 1, also prior to interconnection, with the post aligned for insertion in the socket.
Figure 5:
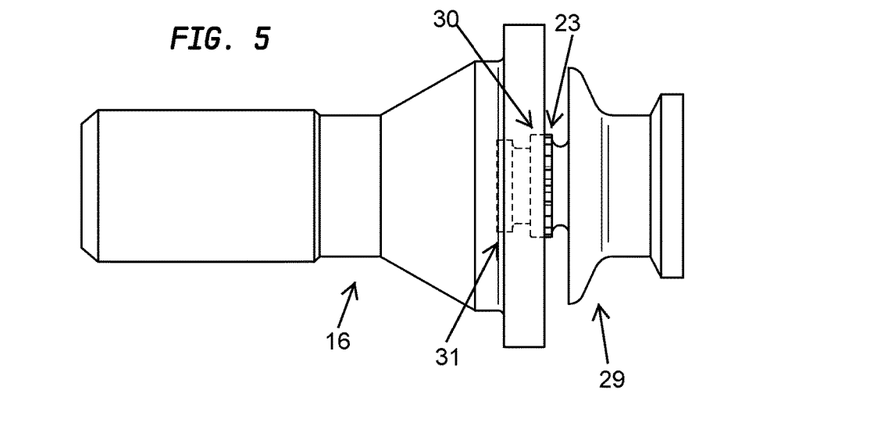
FIG. 5 is a side elevation view showing the example structures of FIG. 1 at an early stage of connection formation.

As shown in FIGS. 2 and 2A, the first connection joint embodiment 15 includes post 30 and socket 20 connection components, with the post 30 being on a first one of the structures 29 and the socket being on a second one of the structures 16. The socket 20 is formed as a substantially circular blind bore 21 having a closed bottom end 22 and an open mouth 23. The post 30 is formed with a substantially cylindrical free end portion 31 that is disposed at or near the bottom end of the socket. The post 30 also has a substantially cylindrical base end 32 disposed at or near the mouth 23 of the socket 20. Referring briefly ahead to FIGS. 3-5, the post 30 further includes a knurl 33 disposed proximate to its base end 32, and a recess 34 formed as an annular groove at the leading edge of the knurl 33, behind the post's substantially cylindrical free end portion 31.

Figure 2B:
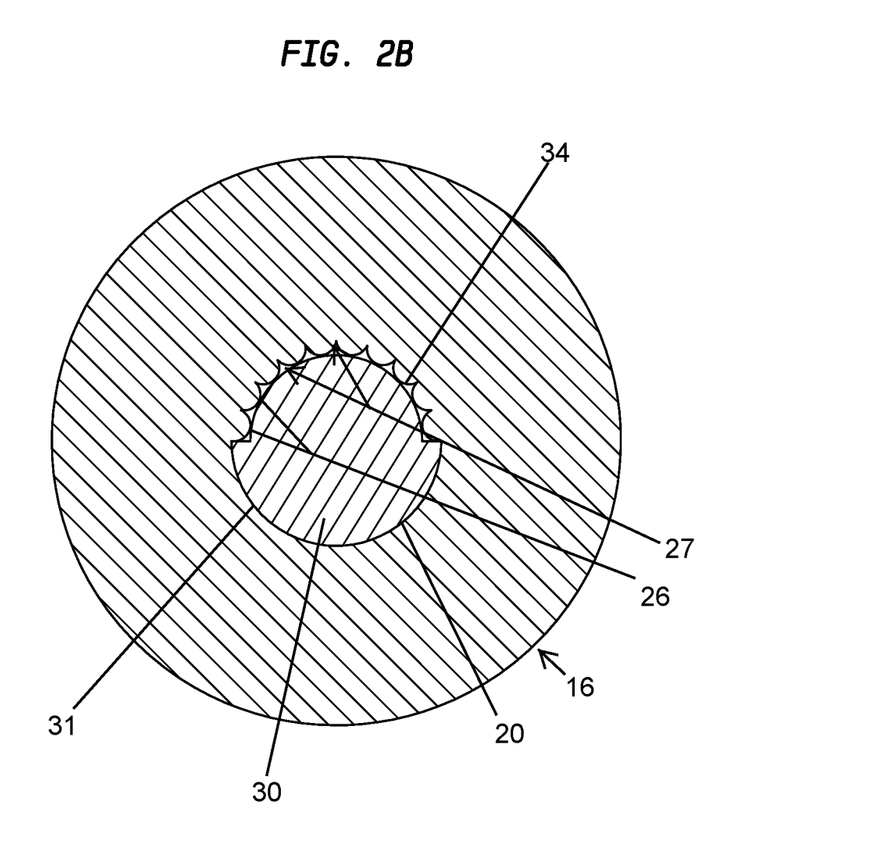
FIG. 2B is an enlarged cross-sectional view taken along line 2B-2B in FIG. 2.

The connection joint of the illustrated embodiment comprises a chip retainer 24 that is integrally formed on the socket 20 and lockingly engaged in the recess 34 formed on the post 30 in order to prevent withdrawal of the post 30 from the socket 20. In the illustrated embodiment, the recess 34 is formed as a continuous annular groove. However, other recess configurations could also be used, such as a non-continuous annular groove. As additionally shown in FIG. 2B, the chip retainer 24 of the present embodiment is formed as a set of chips 26 extending inwardly into the recess 34 from the otherwise substantially circular wall of the socket. FIG. 2B is an enlarged cross-sectional view taken along section line 2B-2B in FIG. 2. The upper half of section line 2B-2B passes through the recess 34 containing the chips 26. The lower half of section line 2B-2B passes to the left of the recess. This is the free end portion 31 of the post 30. Its substantially cylindrical sidewall opposes the substantially circular sidewall of the socket. Insofar as the diameter of the post's free end portion 31 is enlarged relative to the diameter of the recess 34, the post end portion 31 may be thought of as an end flange on the post 30.

As can be seen in FIGS. 2A and 2B, if not for the chips 26 being captured in the recess 34, the post 30 could be slidably removed from the socket 20 by moving it to the right. Removal is prevented, however, by virtue of the left face 25 of the chips 26 engaging the left side 35 of the recess 34, which is the right side of the post's end flange 31, thereby blocking the post so that it cannot be moved in the rightward direction relative to the socket 20. Collectively, the chips 26 represent an integral chip retainer 24 that permanently locks the post 30 in the socket 20 by virtue of the chips 26 being captured in the recess 34. Advantageously, as will now be described, the chips providing the integral chip retainer 24 may be broach-formed during creation of the connection joint, as the post 30 is installed the socket 20, thereby eliminating the need for a separate retainer ring and the formation of corresponding grooves in both the post and the socket.

Turning now to FIGS. 3-5, the example structures of FIG. 1 are shown after they have been selected for interconnection and are undergoing connection formation. As can be seen, the knurl 33 in the illustrated embodiment comprises plural radially extending teeth projections 36. This knurl geometry is shown by way of example only. Many other knurl geometries could also be used, and three such alternatives are described in more detail below in FIGS. 7-9. In FIGS. 3 and 4, the structures are spaced from each other with the post 30 aligned for insertion in the socket 20. In FIG. 5, the structures 16 and 29 have been brought together to a point where the free end 31 of the post 30 has been introduced into the socket 20, and the leading edge of the knurl projections 36 have contacted the surface surrounding the mouth 23 of the socket.

As will now be described with reference to FIGS. 6A-6G, it is the knurl projections 36 on the post 30 that form the chips 26 on the socket as the post 30 is advanced therein. In particular, the knurl projections 36 each act as a broaching implement for broaching the opposing surface of the socket by cutting longitudinal grooves 27 therein, as shown in FIG. 2B. The removed groove material peels away from the opposing surface and forms the chips 26, which may be referred to as broach chips. The chips 26 progressively enter the recess 34 as they grow during connection formation. The recess 34 is situated immediately adjacent to the knurl 33 (at its leading edge) in order to receive the chips 26 as they are peeled from the socket wall surface 21 by the knurl projections.

FIG. 2B, discussed above, illustrates what the chips 26 might look like within the recess 34 at the conclusion of the connection formation process. The exact shape would depend on various factors, including the malleability of the socket wall and the amount of chip material removed by the knurl projections 36. As will be appreciated, the hardness of the socket wall 21 should be less than the hardness of the post 30 to facilitate broaching.

The volume of chip material removed by the broaching operation will depend on the cross-sectional area of the knurl projections 36 and the distance that the post 30 slides within the socket 20 during broaching. It will be appreciated that the volume of the recess 34 (which is determined by its diameter, height, and width) should be chosen to receive all of the peeled chip material. Choosing a recess volume that is too small may prevent the post 30 from being fully inserted in the socket 20. Choosing a recess volume that is too large may weaken the post 30 or allow it to partially move out of the socket 20. The form factor of the recess (i.e., its height-to-width ratio) should also be considered. Making the recess axially long but radially shallow, or radially deep but axially short may have undesirable consequences, such as reducing the strength of the connection joint or impeding the flow of chip material into the recess, rendering connection formation more difficult. A recess with a height-to-width ratio of approximately 1:1 is suggested as a suitable starting point. Other form factors may also be suitable.

Figure 6A:
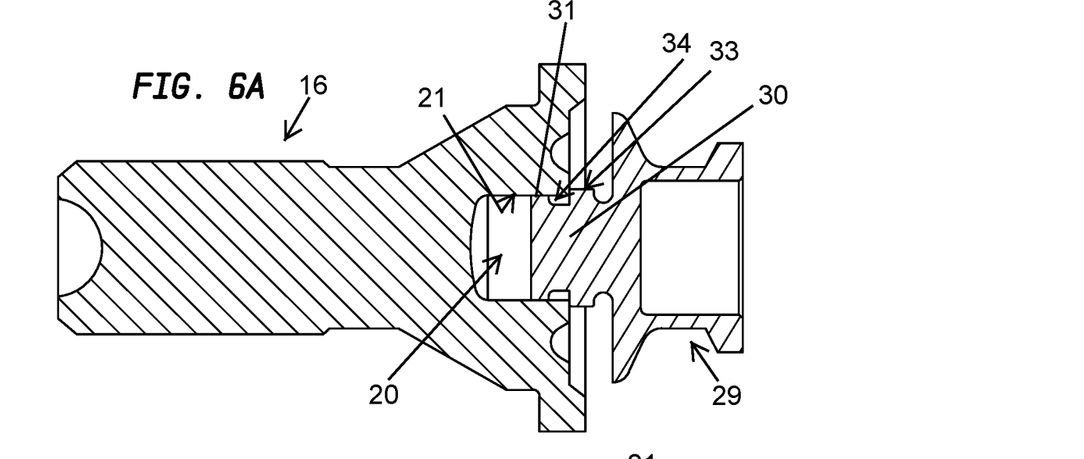
FIGS. 6A-6G are cross-sectional centerline views of the example structures of FIG. 1 showing sequential stages of connection formation, with the post advancing into the socket and broach-forming an integral retainer that permanently locks the post in the socket.
Figure 6B:
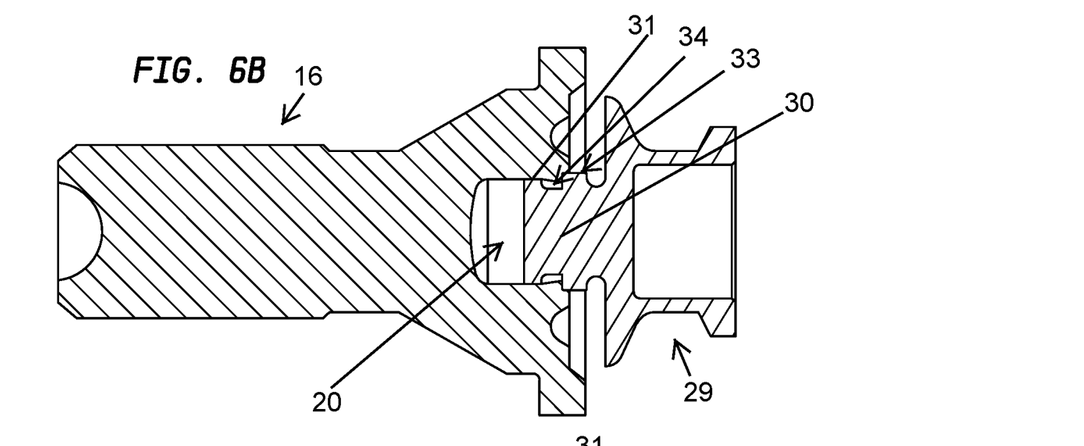
Figure 6C:
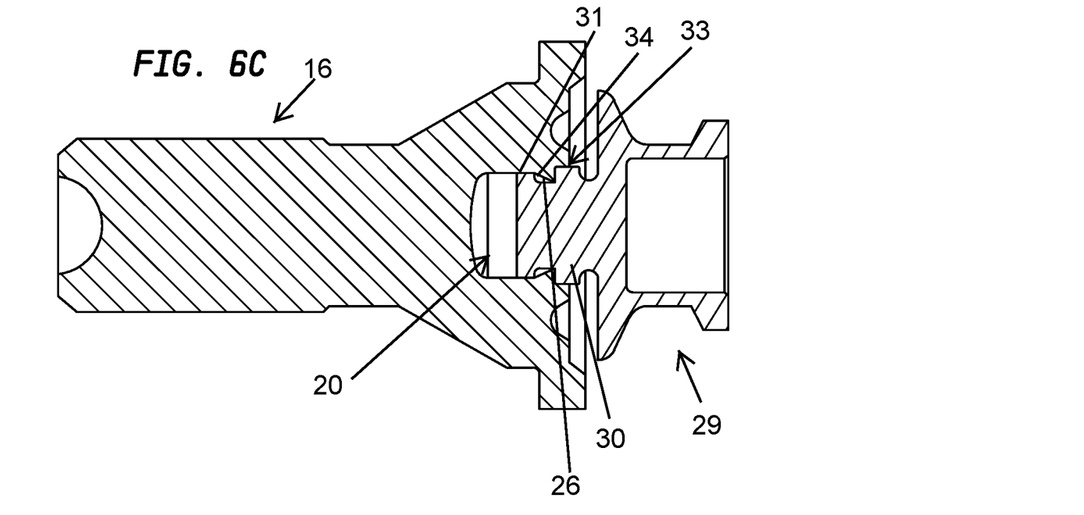
Figure 6D:
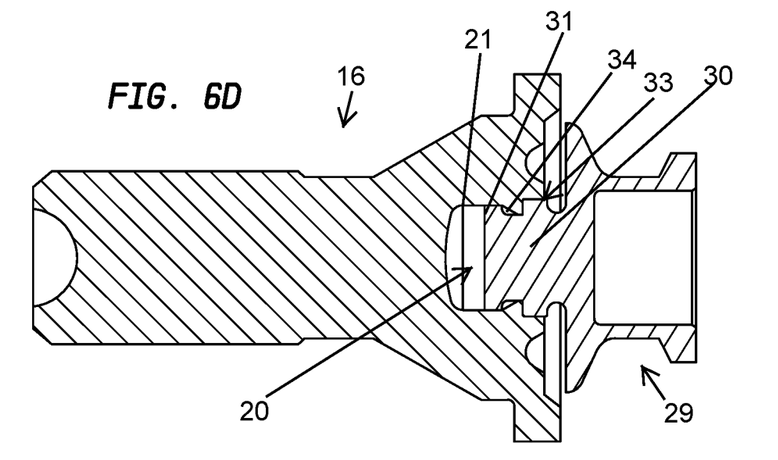
Figure 6E:
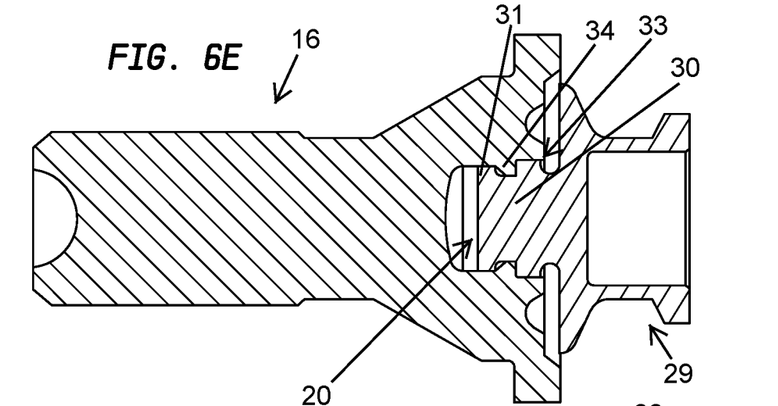
Figure 6F:
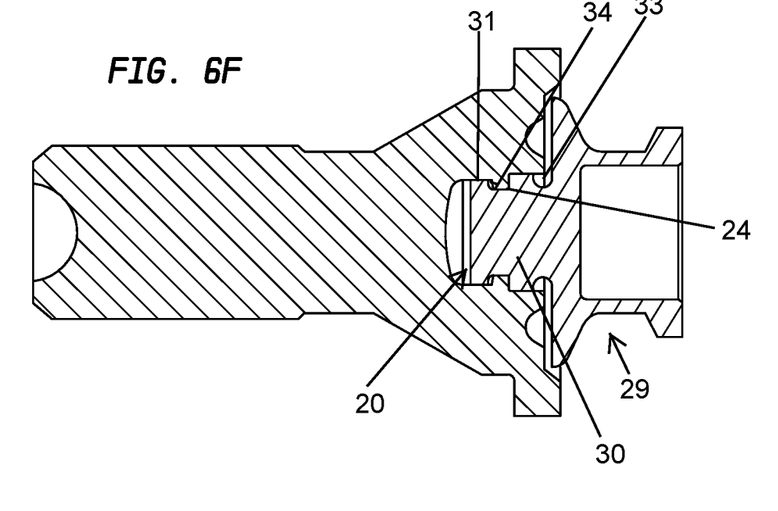
Figure 6G:
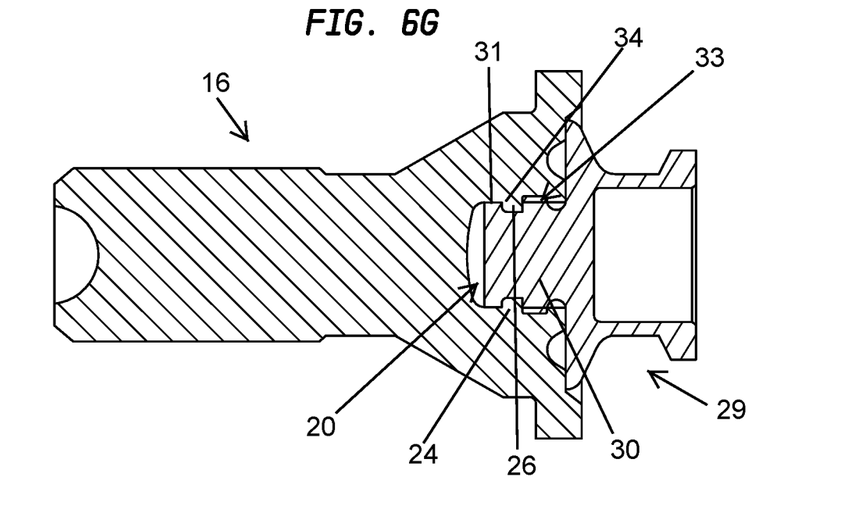

FIGS. 6A-6G are cross-sectional centerline views of the example structures of FIG. 1 showing sequential stages of connection formation, with the post 30 advancing into the socket 20 while the knurl projections 36 broach-form the integral chip retainer 24 that permanently locks the post 30 in the socket 20. FIG. 6A shows the structures in the same position as FIG. 5, where the end flange 31 at the free end of the post 30 has been introduced into the socket 30 and the leading edge of the knurl projections 36 have contacted the surface surrounding the mouth 23 of the socket 20. Advantageously, the end flange 31 acts as a pilot structure to center the knurl projections 36 in the socket 20 during assembly. In FIG. 6B, the post 30 has been advanced slightly further within the socket 20. At this stage of connection formation, the knurl projections 36 have begun to cut corresponding longitudinal grooves 27, shown in FIG. 2B, in the wall 21 of the socket 20, thereby initiating broaching and peeling of the chips 26 away from the wall 21 and into the recess 34. FIGS. 6C-6G respectively show the post 30 as it advances to subsequent locations within the socket 20 while the knurl projections 36 continue to broach the socket wall 21. As can be seen, the chips 26 grow and become successively larger until they reach the final configuration shown in FIG. 6G (also shown in FIG. 2B). As described above, the integral chip retainer 24 formed in this manner permanently locks the post 30 in the socket 20 by virtue of the chips 26 being captured in recess 34.

Figure 7:
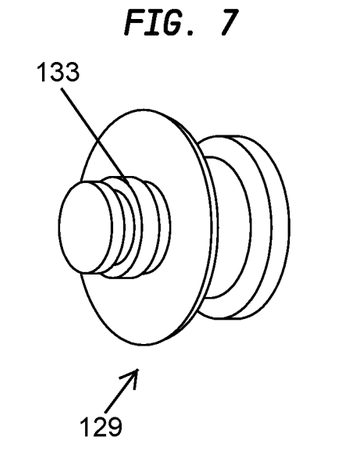
FIG. 7 is a perspective view showing an alternative post connection component that may be used in a modified version of the first connection embodiment.

Turning now to FIG. 7, an alternative post connection component 129 is shown that may be used in a modified version of the first connection embodiment described above. In this modified embodiment, the knurl 133 comprises a single annular projection. Although not shown, the resultant integral chip retainer will tend to be formed as a single substantially annular chip.

Figure 8:
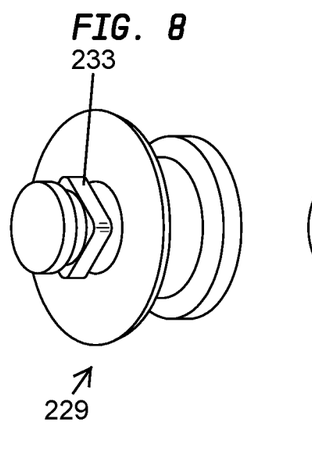
FIG. 8 is a perspective view showing another alternative post connection component that may be used in another modified version of the first connection embodiment.

Turning now to FIG. 8, another alternative post connection component 229 is shown that may be used in another modified version of the first connection embodiment described above. In this modified embodiment, the knurl 233 comprises a square structure whose corners provide four projections. Although not shown, the resultant integral chip retainer will tend to be formed with four separate chips.

Figure 9:
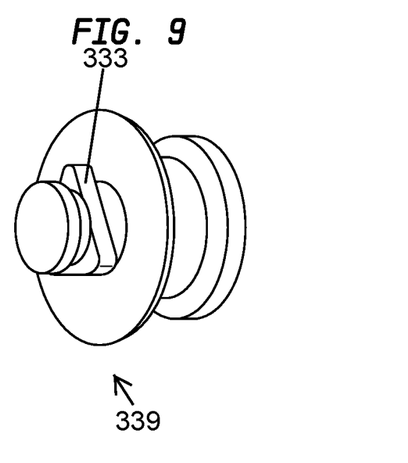
FIG. 9 is a perspective view showing still another alternative post connection component that may be used in still another modified version of the first connection embodiment.

Turning now to FIG. 9, still another alternative post connection component 339 is shown that may be used in still another modified version of the first connection embodiment described above. In this modified embodiment, the knurl 333 comprises a triangular structure whose corners provide three projections. Although not shown, the resultant integral chip retainer will tend to be formed with three separate chips.

It should be noted that FIGS. 7-9 represent only a few additional knurl configurations that may be used to form a permanent connection joint as disclosed herein. Persons skilled in the art following the teachings of the present disclosure will no doubt recognize other configurations that may be used to provide a suitable knurl structure. For example, extending the logic of FIGS. 8 and 9, which show knurls of polygonal shape, additional knurls may be envisioned in which the knurl comprises an n-sided polygon whose corners provide n projections. Many types of non-polygonal knurls may also be envisioned. In general, a knurl as described herein may comprise any surface configuration capable of removing chip material on an opposing surface.

Turning now to the remaining drawing figures, FIGS. 10-15G illustrate two example structures interconnected by a second connection joint embodiment that may be formed in accordance with the present disclosure. The illustrated second embodiment is the inverse of the first embodiment described in connection with FIGS. 1-6G in that the role of the post and the socket are reversed. Instead of the post having a knurl with an adjacent chip-capturing recess, the socket has the knurl and recess structures.

Figure 11:
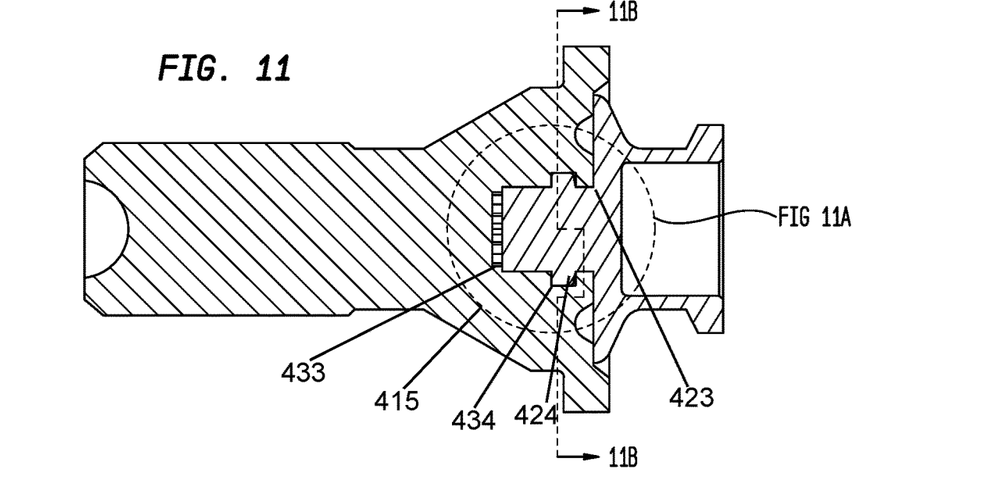
FIG. 11 is a cross-sectional view taken along line 11-11 in FIG. 10 showing post and socket components that may be used in the second connection joint embodiment.
Figure 11A:
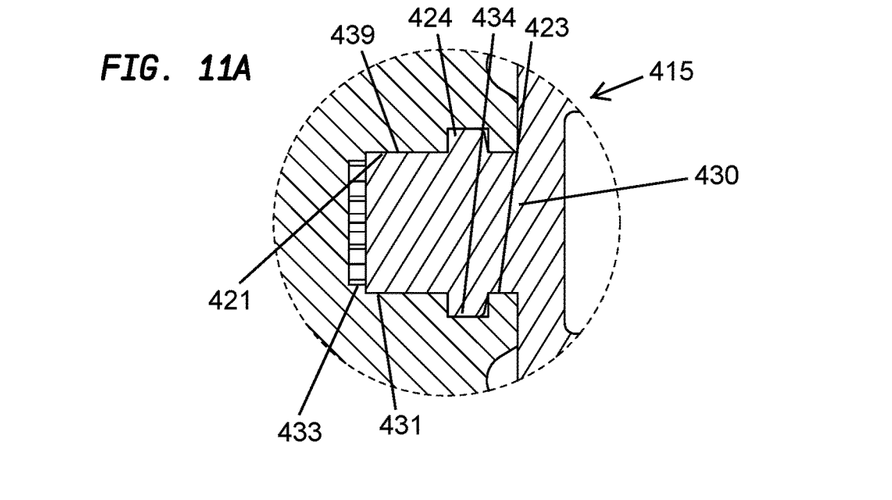
FIG. 11A is an enlarged fragmentary view showing a portion of the cross-sectional view of FIG. 11 to better depict the illustrated post and socket connection components.

As in the first connection joint embodiment, the socket 420 is formed as a substantially circular blind bore having a closed bottom end and an open mouth 423. The post 430 is formed with a substantially cylindrical free end portion 431 that is disposed at or near the bottom end of the socket 420. The post 430 also has a substantially cylindrical base end 432 disposed at or near the mouth 423 of the socket 420. As can be seen in FIGS. 11 and 11A, the socket 420 further includes a knurl 433 disposed proximate to its closed bottom end, and a recess 434 formed as an annular groove proximate to the mouth 423 of the socket 420. As best shown in FIGS. 15A-15G, the knurl 433 extends from the base end 422 of socket 420 to the left side of the recess 434, such that the recess 434 begins at the leading edge of the knurl 433, behind a circular entry portion 438 of the socket that extends from the mouth of the socket to the right side of the recess.

Figure 11B:
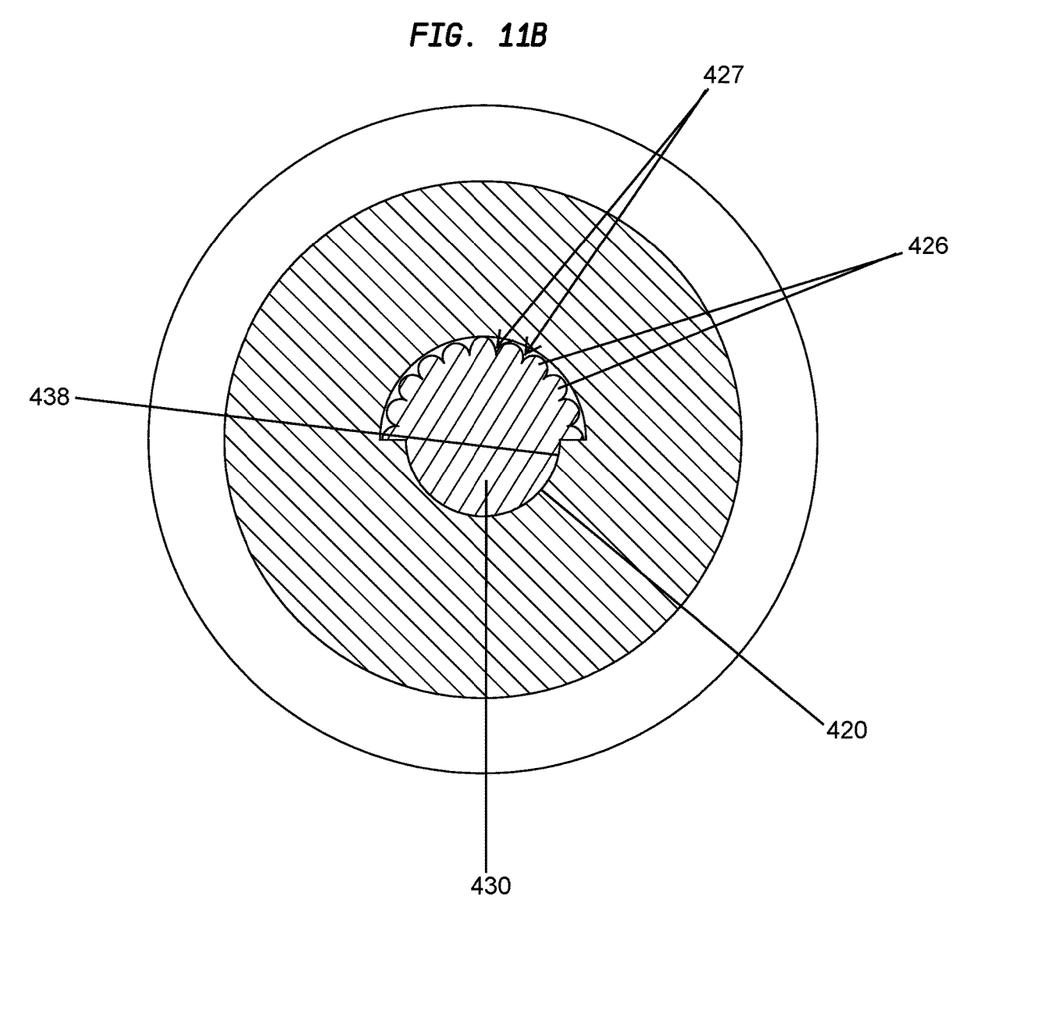
FIG. 11B is an enlarged cross-sectional view taken along line 11B-11B in FIG. 11.

Returning now to FIGS. 11 and 11A, the connection joint 415 of the illustrated embodiment comprises a chip retainer 424 that is integrally formed on the post 430 and lockingly engaged in the recess 434 formed on the socket 420 in order to prevent withdrawal of the post 430 from the socket 420. In the illustrated embodiment, the recess 434 is formed as a continuous annular groove. However, other recess configurations could also be used, such as a non-continuous annular groove. As additionally shown in FIG. 11B, the chip retainer 424 of the present embodiment is formed as a set of chips 426 extending outwardly into the recess 434 from the otherwise substantially cylindrical wall of the post 430. FIG. 11B is an enlarged cross-sectional view taken along section line 11B-11B in FIG. 11. The upper half of section line 11B-11B passes through the recess 434 containing the chips 426. The lower half of section line 11B-11B passes to the right of the recess 434. This is the entry portion 438 of the socket 420. Its substantially circular sidewall opposes the substantially cylindrical sidewall at the base end of the post 430. Insofar as the diameter of the socket's entry portion 438 is reduced relative to the diameter of the recess 434, the entry portion 438 may be thought of as an end flange on the socket 420.

As can be seen in FIGS. 11A and 11B, if not for the chips being captured in the recess 434, the post 430 could be slidably removed from the socket 420 by moving it to the right. Removal is prevented, however, by virtue of the right face of the chips 426 engaging the right side of the recess 434, which is the left side of the socket's entry portion 438 or end flange, thereby blocking the post 430 so that it cannot be moved in the rightward direction relative to the socket 420. Collectively, the chips 426 represent an integral chip retainer 424 that permanently locks the post 430 in the socket 420 by virtue of the chips 426 being captured in the recess 434. As in the first connection joint embodiment, the chips 426 providing the integral chip retainer 424 may be broach-formed during creation of the connection joint 415, as the post 430 is installed into the socket 420, thereby eliminating the need for a separate retainer ring and the formation of corresponding grooves in both the post and the socket.

Figure 10:
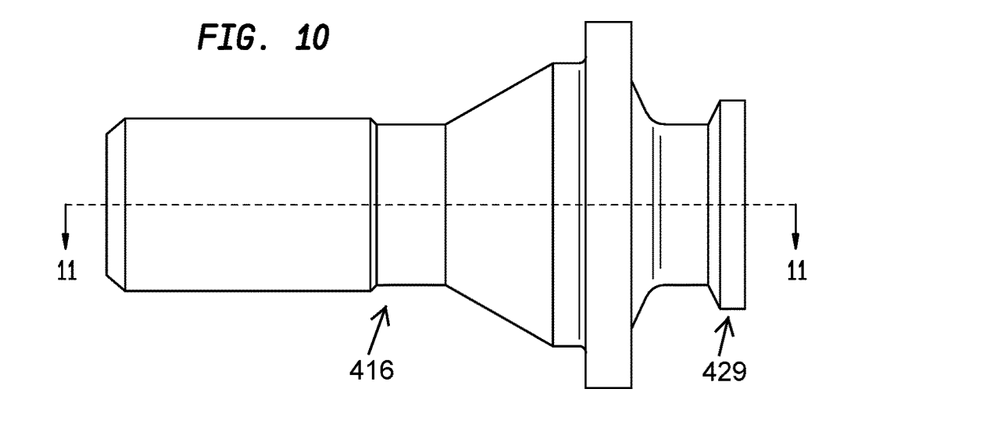
FIG. 10 is a side elevation showing two example structures interconnected by a second connection joint embodiment that may be formed in accordance with the present disclosure.
Figure 12:
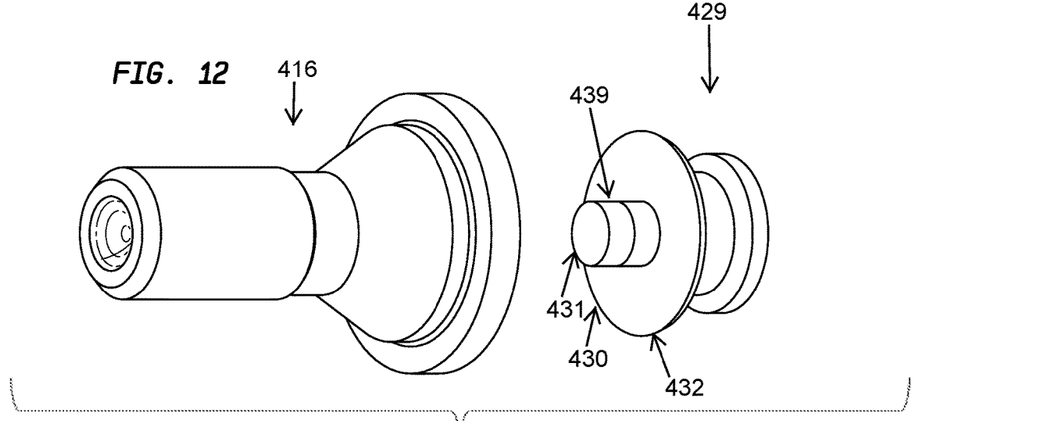
FIG. 12 is perspective view showing the example structures of FIG. 10 prior to interconnection, with the post aligned for insertion in the socket.
Figure 13:
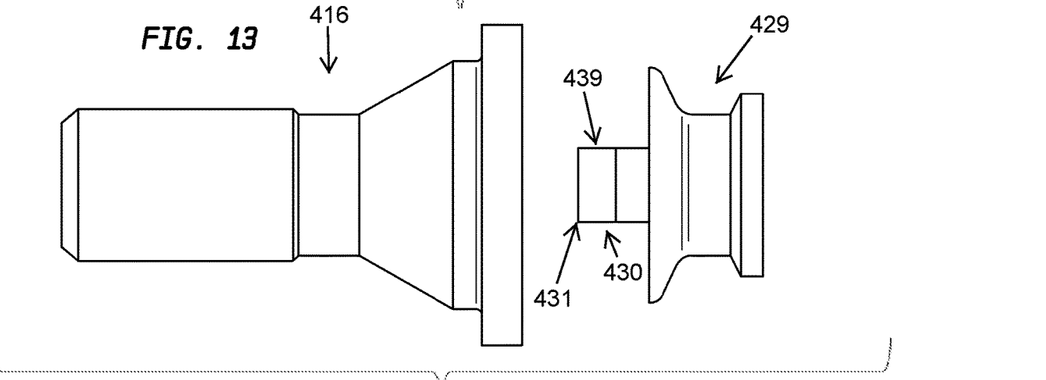
FIG. 13 is a side elevation view showing the example structures of FIG. 10, also prior to interconnection, with the post aligned for insertion in the socket.
Figure 14:
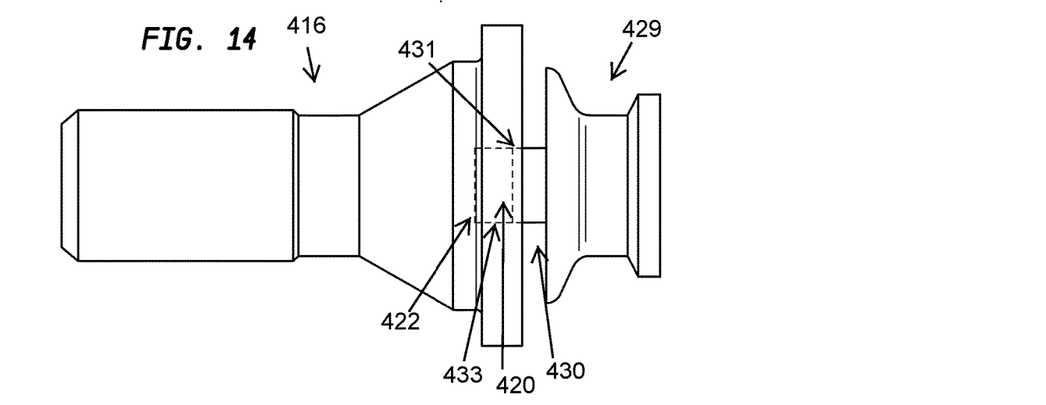
FIG. 14 is a side elevation view showing the example structures of FIG. 10 at an early stage of connection formation.

Turning now to FIGS. 12-14, the example structures of FIG. 10 are shown after they have been selected for interconnection and are undergoing connection formation. As can be seen, the post 430 in the illustrated embodiment is substantially cylindrical due to the fact that the socket 420 comprises the plural radially extending teeth projections 436. In FIGS. 12 and 13, the structures are spaced from each other with the post 430 aligned for insertion in the socket 420. In FIG. 14, the structures 416 and 429 have been brought together to a point where the free end 431 of the post 430 has been introduced into the socket 420 until it contacts the leading edge of the knurl projections 436, shown in FIG. 15A, on the socket 420.

As will now be described with reference to FIGS. 15A-15G, it is the knurl projections 436 on the socket 420 that form the chips 426 on the post 430 as the latter is advanced in the socket 420. In particular, the knurl projections 436 each act as a broaching implement for broaching the opposing surface of the post 430 by cutting longitudinal grooves therein. The removed groove material peels away from the opposing surface and forms the chips 426, which may be referred to as broach chips. The chips 426 progressively enter the recess 434 as they grow during connection formation. The recess 434 is situated immediately adjacent to the knurl 433 (at its leading edge) in order to receive the chips 426 as they are peeled from the post wall surface by the knurl projections 436.

FIG. 11B, discussed above, illustrates what the chips 426 might look like within the recess 434 at the conclusion of the connection formation process. As in the first connection joint embodiment, the exact shape would depend on various factors, including the malleability of the post wall 439 and the amount of chip material removed by the knurl projections 436. As will be appreciated, the hardness of the post 430 should be less than the hardness of the socket wall 421 to facilitate broaching. As also discussed above, the volume of chip material removed by the broaching operation will likewise depend on the cross-sectional area of the knurl projections 436 and the distance that the post 430 slides within the socket 420 during broaching. Likewise, the form factor of the recess 434 (i.e., its height-to-width ratio) should also be considered.

Figure 15A:
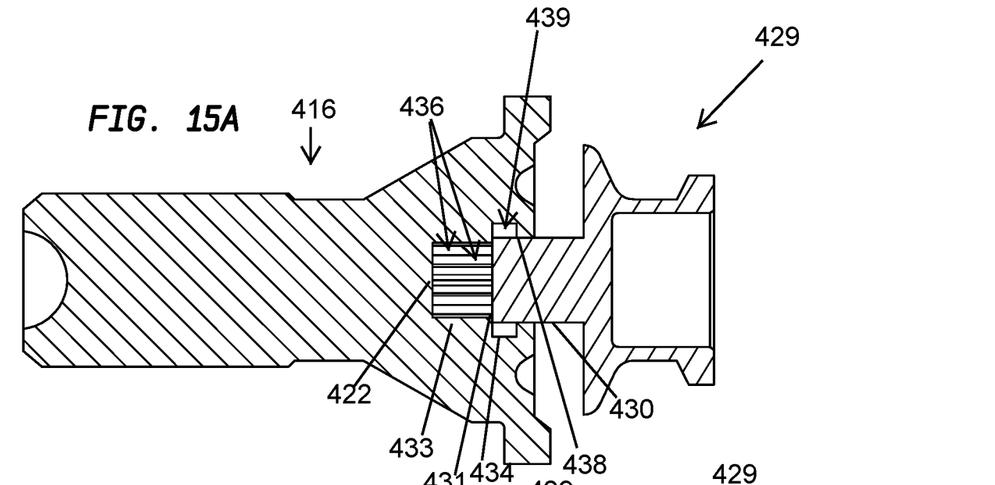
FIGS. 15A-15G are cross-sectional centerline views of the example structures of FIG. 10 showing sequential stages of connection formation with the post advancing into the socket and self-forming an integral retainer that permanently locks the post in the socket.
Figure 15B:
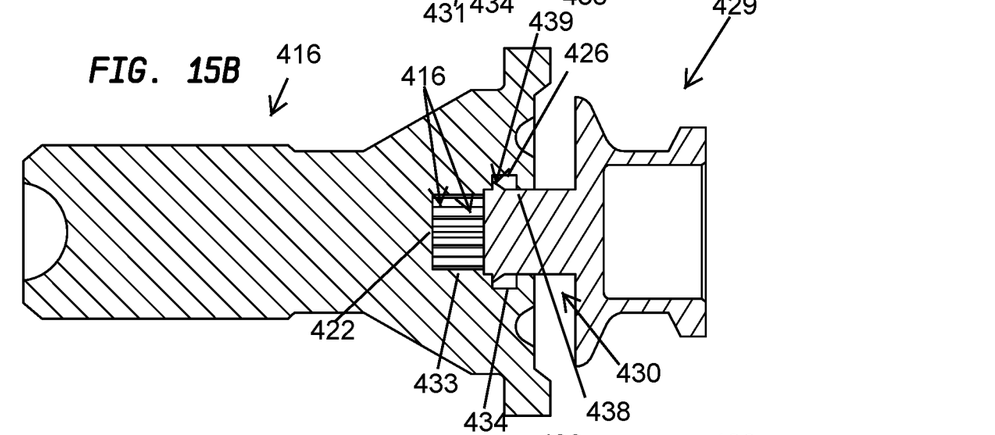
Figure 15C:
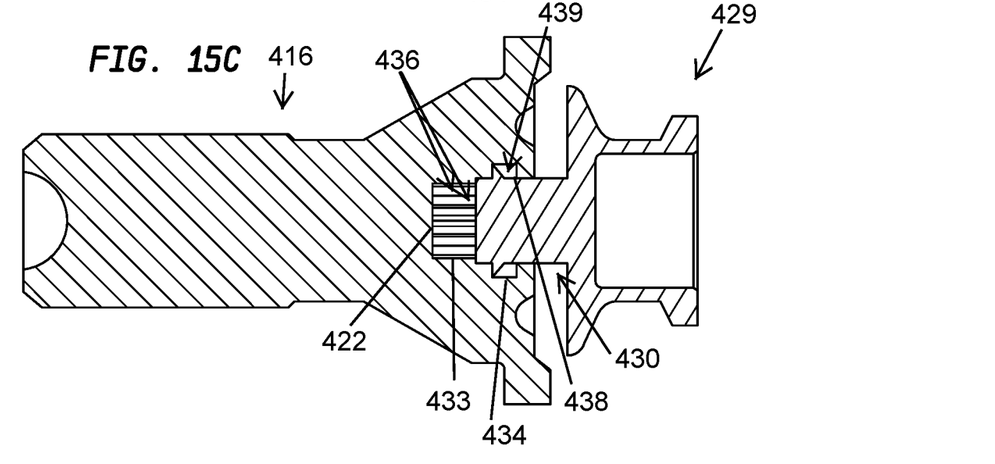
Figure 15D:
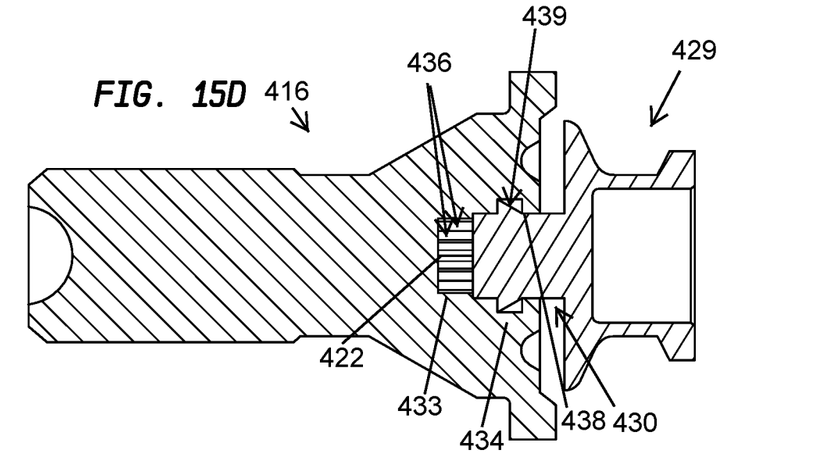
Figure 15E:
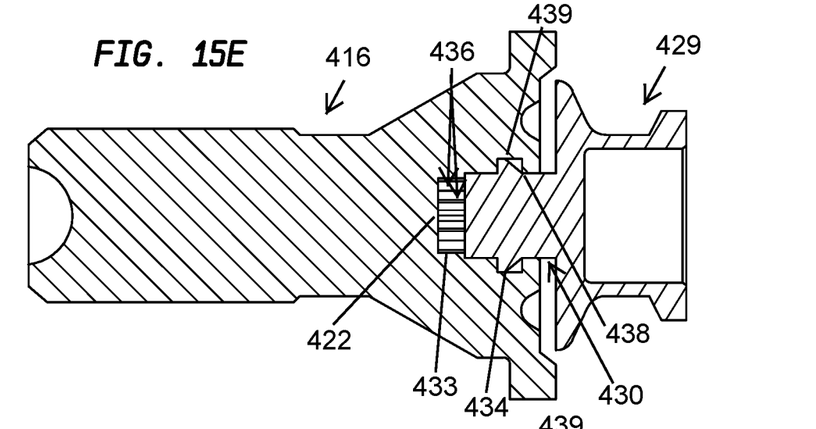
Figure 15F:
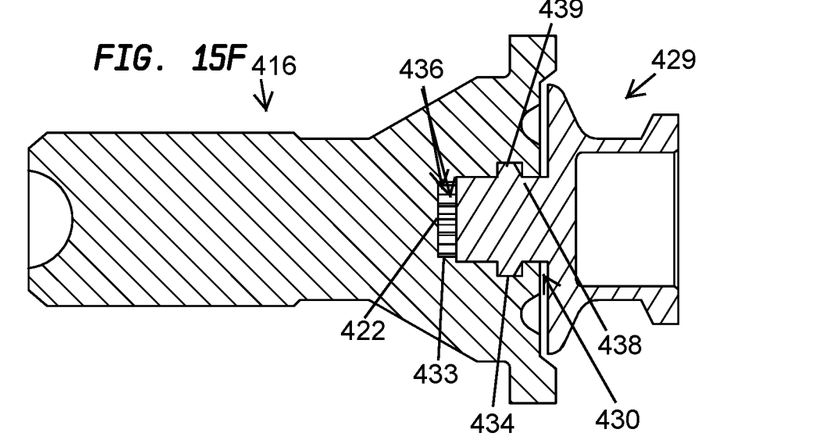
Figure 15G:
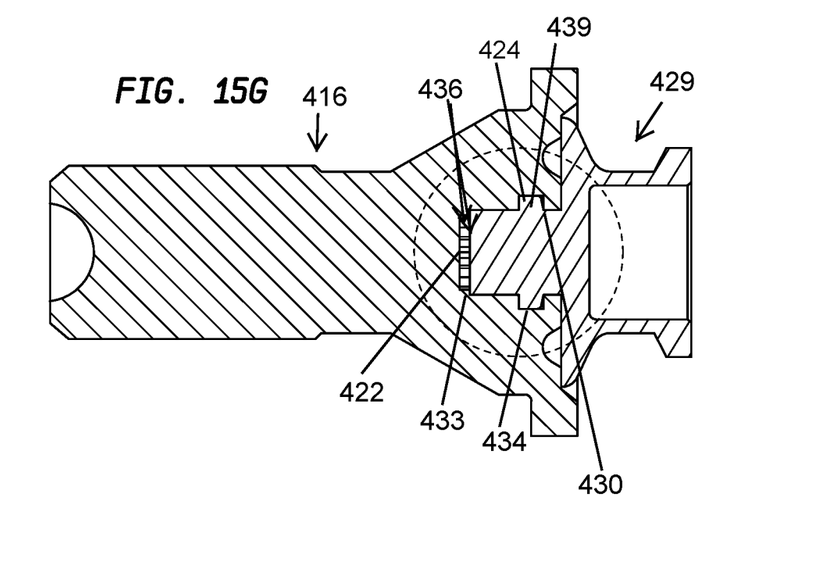

FIGS. 15A-15G are cross-sectional centerline views of the example structures of FIG. 10 showing sequential stages of connection formation, with the post 430 advancing into the socket 420 while the knurl projections 436 broach-form the integral chip retainer 424 that permanently locks the post 430 in the socket 420. FIG. 15A shows the structures in the same position as FIG. 14, where the free end 431 of the post 430 has been introduced into the socket 420 and contacts the leading edge of the knurl projections 436. In FIG. 15B, the post 430 has been advanced slightly further within the socket 420. At this stage of connection formation, the knurl projections 436 have begun to cut corresponding longitudinal grooves 427, as shown in FIG. 11B, in the wall 439 of the post 430, thereby initiating broaching and peeling of the chips 426 away from the wall 439 and into the recess 434. FIGS. 15C-15G respectively show the post 430 as it advances to subsequent locations within the socket 420 while the knurl projections 436 continue to broach the post wall 439. As can be seen, the chips 426 grow and become successively larger until they reach the final configuration shown in FIG. 15G (also shown in FIG. 11B). As described above, the integral chip retainer 424 formed in this manner permanently locks the post 430 in the socket 420 by virtue of the chips 426 being captured in recess 434.

It should be noted that the various knurl configurations of FIGS. 7-9 that may be provided on the post of the first connection joint embodiment 15 could also be formed within the socket of the second connection joint embodiment 415. Persons skilled in the art following the teachings of the present disclosure will likewise also recognize other configurations that may be used to provide a suitable knurl structure within the socket. For example, extending the logic of FIGS. 8 and 9, which show knurls of polygonal shape, additional knurls may be envisioned in which the knurl comprises an n-sided polygon whose corners provide n projections. Many types of non-polygonal knurls may also be envisioned. As in the case of the first connection joint embodiment 15, a knurl for use in the second connection joint embodiment 415 may comprise any surface configuration capable of removing chip material on an opposing surface.

Accordingly, a permanent connection joint and related method for interconnecting structures has been disclosed. While various embodiments of the joint connection have been shown and described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A method for forming a permanent connection joint to interconnect structures, comprising:
   selecting a first structure having a post;
   selecting a second structure having a socket;
   said post and said socket being adapted to be joined together in opposing relationship with said post disposed in said socket;

said socket having a mouth and a knurl with one or more radially and inwardly extending projections that each act as a broaching implement;

said socket also having a recess disposed adjacent to said knurl and between said knurl and said mouth of said socket;

introducing said post into said socket;

advancing said post in said socket so that said one or more knurl projections broach a surface of said opposing post and form one or more broach chips on said surface that are captured in said recess of said socket; and said one or more broach chips providing a self-formed integral chip retainer that permanently locks said post in said socket by virtue of said broach chip(s) being captured in said recess of said socket.

2. The connection joint method of claim 1, comprising the step of providing said knurl with plural projections.

3. The connection joint method of claim 2, comprising the step of providing said knurl with plural radially extending teeth projections.

4. The connection joint method of claim 1, comprising the step of providing said knurl with a single annular projection or an n-sided polygon structure whose corners provide n projections.

5. The connection joint method of claim 1, comprising the step of providing said knurl with a square structure whose corners provide four projections or a triangular structure whose corners provide three projections.

6. The connection joint method of claim 1, comprising the step of providing said recess with an annular groove.

7. The connection joint method of claim 1, comprising the step of providing said first and second structures with components of a vehicle wheel lock fastener.

8. A permanent connection joint, comprising:

a post;

a socket;

said post and said socket being joined together in opposing relationship with said post disposed in said socket;

said socket having a mouth and a knurl with one or more radially and inwardly extending projections that each comprise a broaching implement;

said socket also having a recess disposed adjacent to said knurl and between said knurl and said mouth of said socket;

said post being disposed in said socket with said one or more knurl projections having broached a surface of said opposing post to form one or more broach chips on said surface that are captured in said recess of said socket; and said one or more broach chips providing a self-formed integral chip retainer that permanently locks said post in said socket by virtue of said broach chip(s) being captured in said recess of said socket.

9. The connection joint of claim 8, wherein said knurl comprises plural projections.

10. The connection joint of claim 9, wherein said knurl comprises plural radially extending teeth projections.

11. The connection joint of claim 8, wherein said knurl comprises a single annular projection or an n-sided polygon structure whose corners provide n projections.

12. The connection joint of claim 8, wherein said knurl comprises a square structure whose corners provide four projections or a triangular structure whose corners provide three projections.

13. The connection joint of claim 8, wherein said recess comprises an annular groove.

14. The connection joint of claim 8, wherein said post and said socket are components of a vehicle wheel lock fastener.

15. The connection joint of claim 8, wherein said post comprises a fastener body.

* * * * *